Feb. 12, 1952　　　E. DELETAILLE　　　2,585,634
SPEED VARIATOR
Filed Jan. 28, 1947　　　　　　　　　6 Sheets-Sheet 1
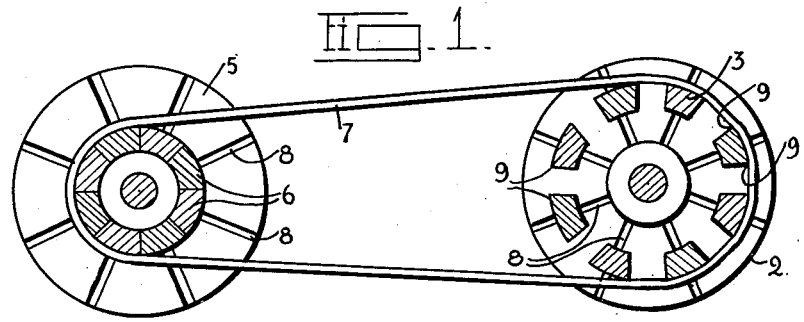
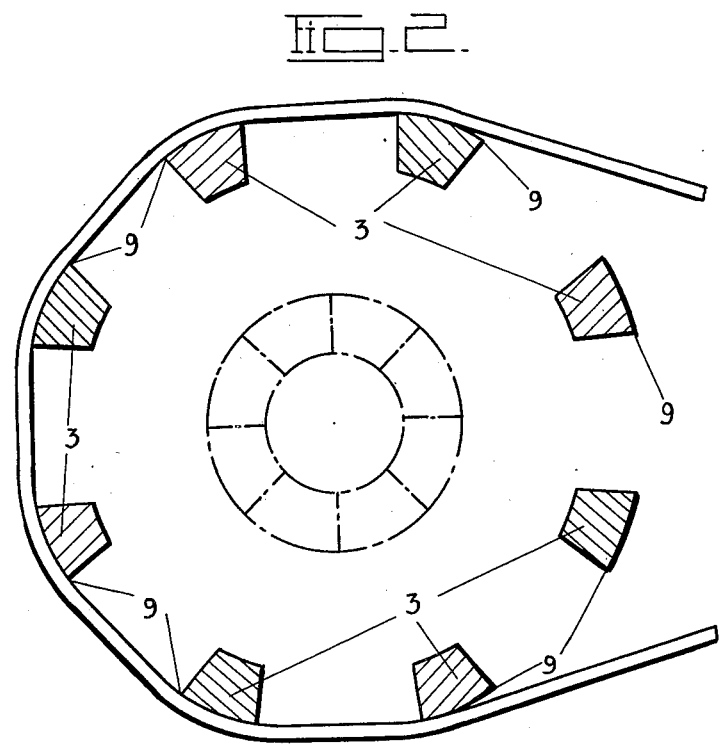
INVENTOR
Emile Deletaille
By: Young, Emery & Thompson
ATTYS-

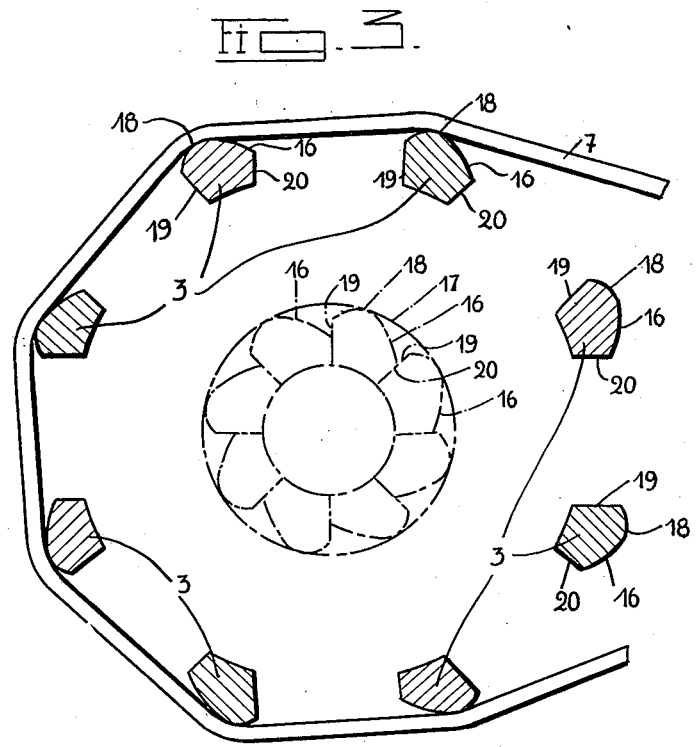
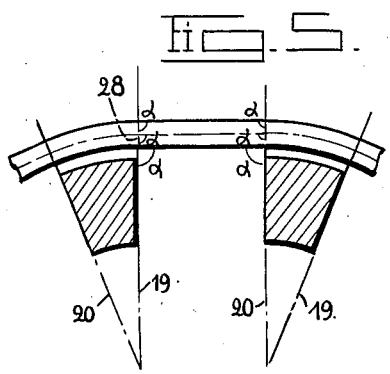

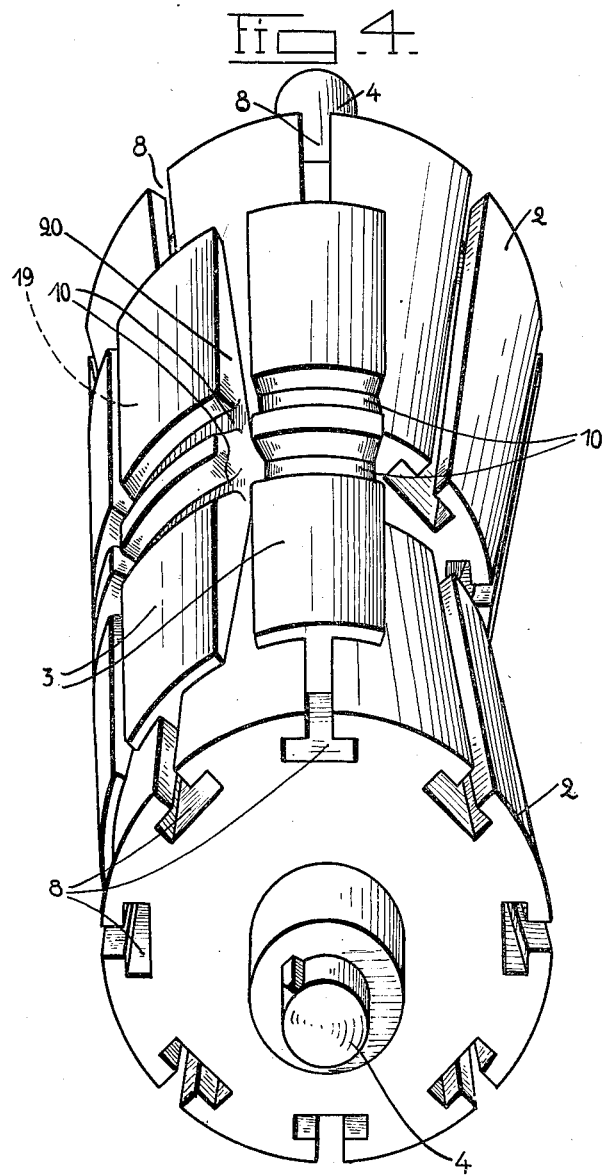

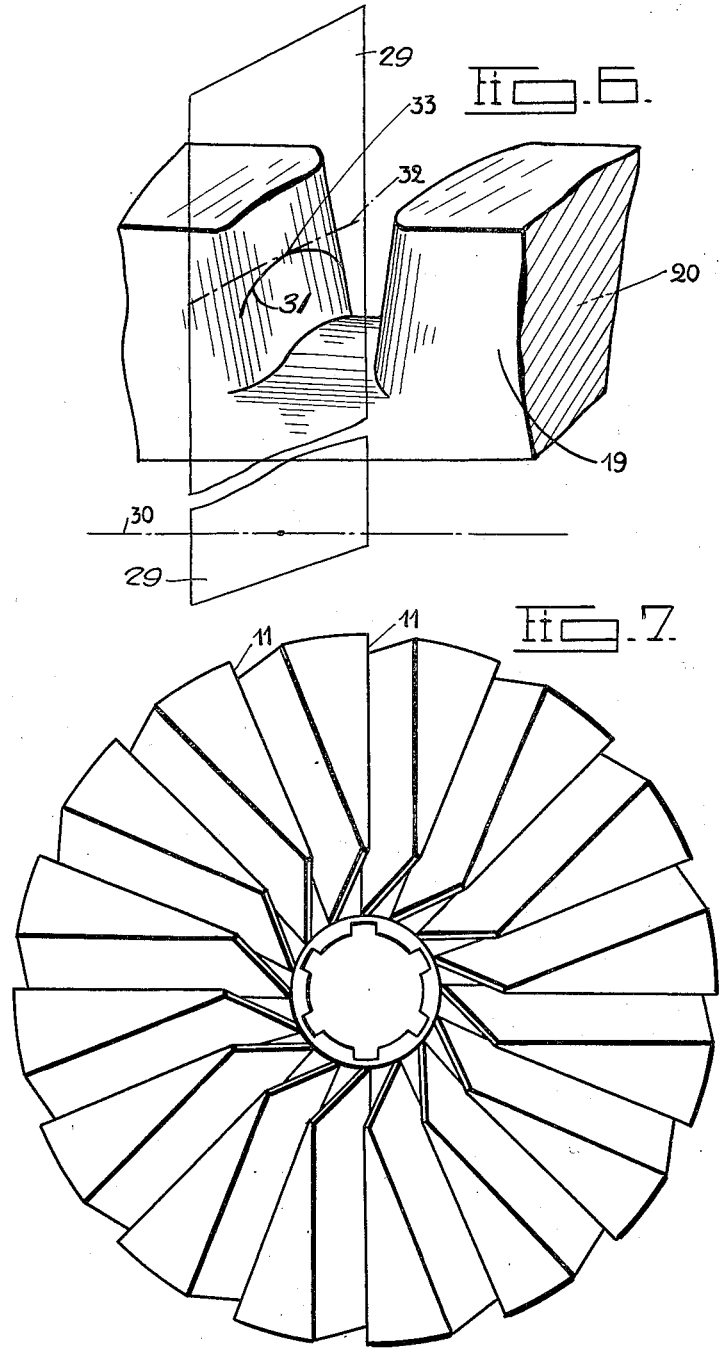

Feb. 12, 1952 — E. DELETAILLE — 2,585,634
SPEED VARIATOR
Filed Jan. 28, 1947 — 6 Sheets-Sheet 5
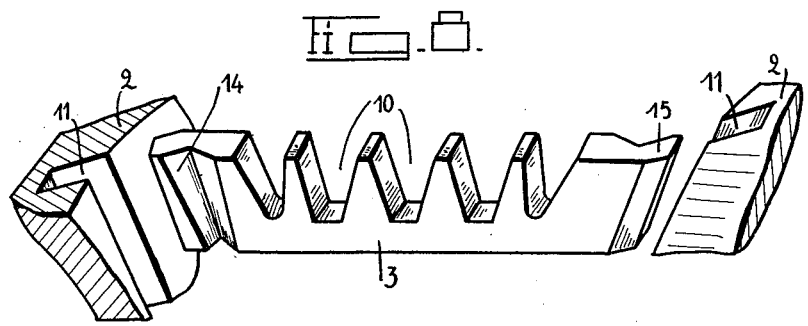
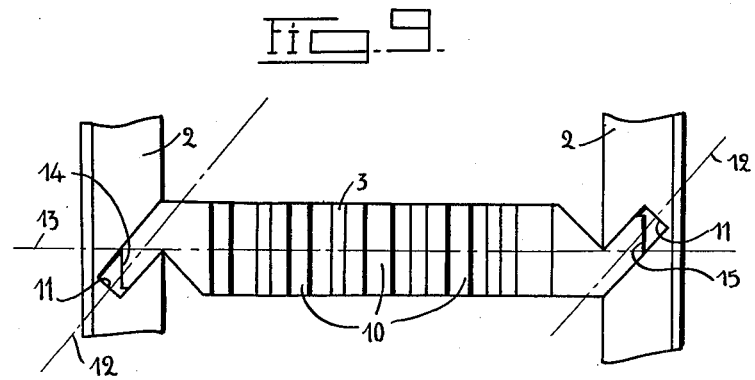
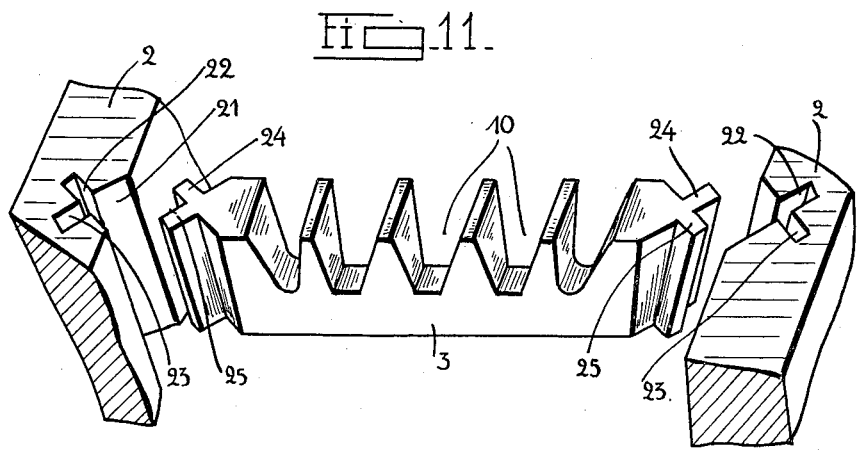
INVENTOR
Emile Deletaille
By Young, Emery & Thompson
ATTYS.

Feb. 12, 1952  E. DELETAILLE  2,585,634
SPEED VARIATOR
Filed Jan. 28, 1947  6 Sheets-Sheet 6
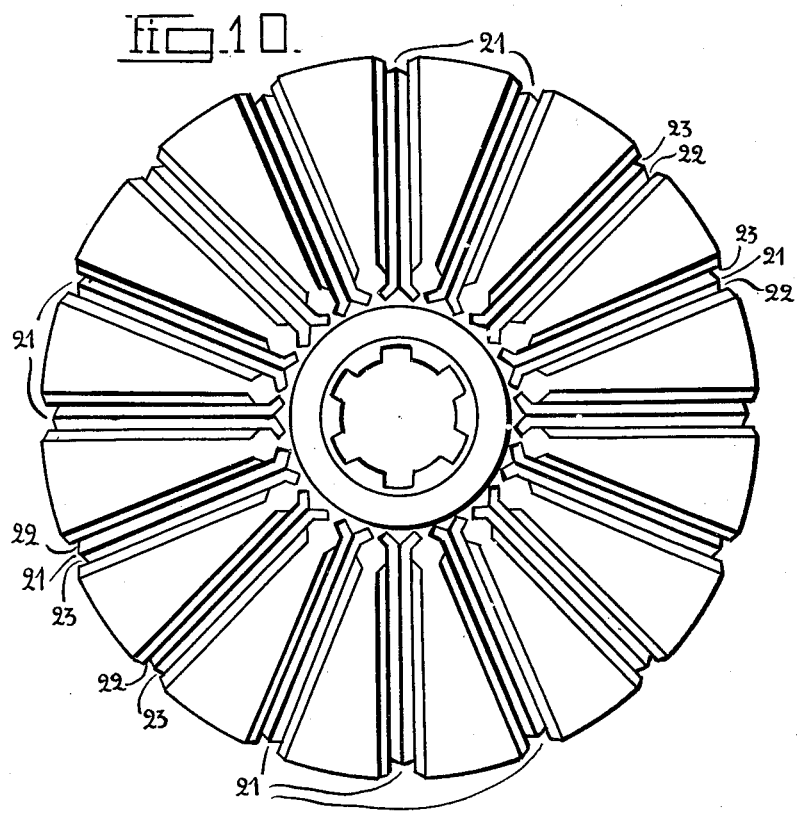
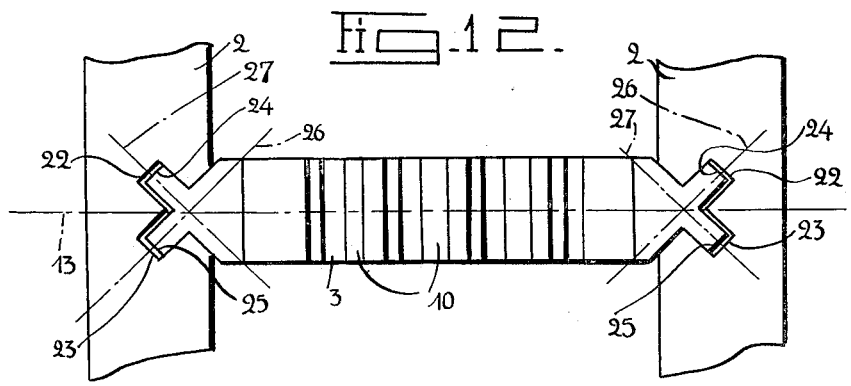
INVENTOR
Emile Deletaille
By Young, Emery & Thompson
Attys.

Patented Feb. 12, 1952

2,585,634

UNITED STATES PATENT OFFICE 2,585,634

SPEED VARIATOR

Emile Deletaille, Woluwe-St. Pierre, Belgium

Application January 28, 1947, Serial No. 724,812
In Belgium March 18, 1943

Section 1, Public Law 690, August 8, 1946
Patent expires March 18, 1963

4 Claims. (Cl. 74—230.21)

The present invention relates to a variable-speed gearing or speed variator comprising a pair of coaxial rotating conical discs facing each other and serving, by means of a belt, to drive another pair of conical discs of the same type, the axis of which is parallel to that of the first discs, the winding radius of said belt being able to vary on a pair of discs in the direction opposite to that on the other pair, by variations in reversed direction of the distance between the discs of each pair.

In the known variators of this type, the above-said belt is of trapezoidal cross section. In order to give the possibility of a wide speed variation, very broad belts are used, what forms an obstacle to the use of standardized trapezoidal belts, the breadth of which is comparatively low in comparison with their thickness. Finally, the transmission of high powers induces to the utilization of several variators in parallel because a single trapezoidal belt, even of sufficient cross section, presents only two adherent surfaces with respect to the driving discs and can, therefore, only transmit a comparatively limited couple.

The present invention has for its object to remove these disadvantages.

To this end, in the speed variator according to the invention, the discs of each pair are connected together by bars parallel to the rotation axis, the ends in form of tenon of which bars are engaged in grooves extending along the generatrices of the conical surfaces of the discs, so that when the discs are moved towards each other or away from each other, the bars are forcibly moved respectively away from the rotation axis or towards it and, consequently, the distance between the rotation axis and the belt part embracing these bars is increased or decreased.

This speed variator makes it possible to use belts of every form and size as they must no more travel between conical discs. The angle at the apex of the conical surfaces of the discs may be rather small and, when trapezoidal belts are used, completely independent of the angle of these belts.

If, for reasons having nothing to do with a speed variation, it is desired to use such belts, the above-said bars are provided with notches corresponding to the cross sections of the belts in order that the latter can be lodged therein. By giving a sufficient length to the bars, the latter can be provided with as many notches as it is desired to adopt belts.

According to a special form of construction, the grooves in the conical discs have in cross section the form of a dovetail.

According to another form of construction, the above-said grooves have their mean plane inclined on the rotation axis of the discs in which they are formed and this in such directions that the tenons of each bar are disposed on either side of the diametral plane passing by the axis of the bar under consideration.

According to still another form of construction, the above-said grooves are formed by the intersection of two grooves both disposed parallelly to mean planes, each of which is inclined under a certain angle on the rotation axis of the discs wherein said grooves are formed.

Other peculiarities and details of the invention will appear in the course of the description of the accompanying drawings which represent diagrammatically by way of example only several forms of construction of a speed variator according to the invention.

Figure 1 represents diagrammatically a speed variator according to the invention.

Figure 2 shows diagrammatically the comportment of the belt on the bars of a speed variator according to the invention.

Figure 3 is a diagrammatical view of another form of bar surfaces at the contact place with the belt.

Figure 4 is a perspective view of a pair of conical discs and of the bars connecting these discs together.

Figure 5 shows diagrammatically the comportment of a trapezoidal belt on the bars of a speed variator according to the invention, said bars being formed with notches corresponding to the cross section of the belt.

Figure 6 is a perspective view of a part of a speed variator similar to that shown in Figure 5.

Figure 7 is a view of the conical surface of one of the discs of a speed variator according to the invention, different from that of which a part is shown in Figure 4.

Figure 8 is a perspective view intended to show how a bar of the speed variator according to Figure 7 is constructed in view of its coupling to the rotating discs it connects together.

Figure 9 is a diagrammatical plan view of the bar of Figure 8 and of a part of the discs which are assembled therewith.

Figure 10 is a view of the conical surface of one of the discs of a speed variator according to the invention, different from that shown in the preceding figures.

Figure 11 is a perspective view intended to show how a bar of the speed variator according to Figure 10 is formed in view of its coupling to the rotating discs it connects together.

Figure 12 is a diagrammatical plan view of the bar of Figure 11 and of a part of the discs which are assembled therewith.

Like characters of reference refer to like parts in the several figures.

Referring to the drawings, Figure 1 represents a speed variator comprising a pair of conical discs 2 connected together by bars 3 parallel to the rotation axis of the shaft 4 on which these discs are keyed, and another pair of conical discs 5 similar to the former, connected together by bars 6 similar to the bars 3. One or several belts 7 pass over the bars 3 and 6. The distance between the discs 2 can be adjusted by moving these discs along their axis 4. A modification of this distance results in a variation of the distance between the bars 3 and the rotation axis of the shaft 4 by the fact that the ends in form of tenons of the bars 3 are located in grooves 8 extending along the generatrices of the conical surfaces of the discs.

A variation of the distance between the discs 2 is accompanied by a variation in opposite direction of the distance between the discs 5. This variation of the distance between the latter provokes thus forcibly a variation in opposite direction of the distance between the bars 6 and the rotation axis.

Thereby an increasing of the winding radius of the belt or belts 7 which pass over the bars 3 connecting the discs 2 results in a proportional decrease of the winding radius of the belt or belts embracing the bars 6 connecting the discs 5 and vice versa.

It results therefrom that if the rotation speed of the shaft 4 on which the discs 2 are keyed remains constant, the speed of the shaft on which the discs 5 slide is variable. This speed tends to increase when the bars 3 move away from their rotation axis 4 and the bars 6 move towards theirs and inversely to decrease when the bars 3 move towards their rotation axis and the bars 6 move away from theirs.

In Figure 1, the bars 6 are represented in the position they assume when they are nearest the rotation axis of the discs 5 to which they are connected. In this position they are joined. According to a feature of the invention, in this position, their peripheral surfaces form the peripheral surface of the same cylinder of revolution.

As the bars move away from their rotation axis to assume for instance a position similar to that assumed by the bars 3 of Figure 1, they do no more form a continuous peripheral surface since they are no more joined.

The belt rests then on a series of arcs of a circle as illustrated diagrammatically in Figure 2.

Supposing the belt to be perfectly deformable in the interval between these arcs of a circle, it tends to dispose itself along a straight line joining the extremities of these arcs. It will be seen from Figure 2 that provided that the peripheral surfaces of the bars 3 form the peripheral surface of a same cylinder of revolution, when these bars are nearest their rotation axis and are joined, whatever may be the distance between these bars and the rotation axis when they move away from the latter, the line of the belt supposed to be perfectly deformable in the interval between two neighbouring bars is a tangent at the extremities 9 of each arc of a circle which limits outwardly the cross section of two adjacent bars.

It results therefrom that even in the hypothesis of a belt perfectly deformable, provided that the above-mentioned feature will be observed, the belt can never come into contact with sharp edges of the bars, such as those indicated at 9 in Figures 1 and 2.

The more the employed belt is rigid, the more it tends to deviate outwardly from the straight line joining the points 9 of two neighbouring bars. Consequently, the danger for the belt to come into contact with sharp edges 9 of the bars, which could damage it, decreases.

According to a different form of construction in accordance with the invention, the line limiting outwardly the cross section of each bar is a curve which, even when the bars are joined, is inwardly tangent to the circumference having its center on the rotation axis of the conical discs and passing by a point situated between the extremities of this curve.

This form of construction is represented in Figure 3, where the bars are shown in the joining position in dot-and-dash lines and in a non-joining position in full lines. As can be seen from the drawing, the curve 16 which forms the external limit of the cross section of each bar is for the position where the bars are joined, inwardly tangent to the circumference 17, the center of which is situated on the rotation axis of the conical discs, at a point situated between the radial planes 19 and 20 delimiting the bar under consideration. In this case, even in the hypothesis of a perfectly deformable belt, when the bars are not joined, as shown in full lines, the belt or belts can never come into contact with the sharp edges delimiting each bar.

The curve 16 could also be confounded along a part of its length with the circumference 17. In this case, it would thus be inwardly tangent to this circumference along a part of its length between the radial planes 19 and 20.

Figure 4 shows that the grooves 8 have in cross section the form of a dovetail. Figure 4 shows further that the angles at the apex of the conical discs are comparatively small. As the length of the bars may be chosen at will, very wide belts or any number of belts of usual width working in parallel may be employed.

These belts may occasionally be lodged in notches formed in the bars and corresponding to the cross section of the belts under consideration.

Figure 4 shows notches 10 adapted to accommodate trapezoidal belts. The angles at the apex of the conical discs 2 are smaller than the supplement of the angle between the inclined faces of the trapezoidal belts.

As in practice the trapezoidal belts come into contact with the notches 10 only with the lateral faces of the latter, these belts, according to a feature of the invention, come into contact with the notches along the edges 28 (Figure 5) formed by the intersection of these faces with the radial planes 19 and 20 delimiting the bars under an angle $a$ equals to 90°.

To this end, the corresponding lateral faces of the notches form parts of the same cone of revolution when the bars are joined. Consequently, said edges do not tend to damage the belt.

In order that even in the case of a slight displacement of the bars having the effect to destroy the perfect alignment of the notches, the above-said protection is still secured, it is provided, according to the invention, to widen the notches towards the radial planes 19 and 20 (Figure 6) delimiting the lateral faces of the bars. In this case, the intersection of the lateral faces of the notches in each bar with any plane 29 perpendicular to the rotation axis 30 of the conical discs is a curve 31, which, even when the bars are joining, is inwardly tangent to the circumference 32 having its center on the rotation axis 30, at a point 33 situated between the radial planes 19 and 20 delimiting the bar under consideration. This curve could be confounded along a part of its length with the circumference 32. In this case, it would thus be inwardly tangent to this circumference along a part of its length between the radial planes 19 and 20.

Figure 7 shows the conical surface of one of the discs of another speed variator according to the invention, in which grooves 11 are formed parallelly to a mean plane inclined on the rotation axis of the discs. This inclination appears in Figure 9, where it can be seen that the plane 12 is inclined on the rotation axis 13. The bars connecting two discs facing each other in a same pair are provided with tenons engaged in the grooves 11.

The tenons 14 and 15 at both extremities of each bar are disposed on either side of a diametral place passing by the axis of the bar under consideration.

Figure 10 shows the conical surface of one of the discs of another speed variator according to the invention, in which grooves 21 (Figures 10 to 12) are formed by the intersection of two grooves 22 and 23 both disposed in parallelism with mean planes 26 and 27 (Figure 12) each inclined under an angle with respect to the rotation axis 13 of the discs in which they are formed. Tenons 24 and 25 are engaged in these grooves 22 and 23.

The inclination of the latter on the rotation axis 13 appears in Figure 12 where it is to be seen that the planes 26 and 27 are both inclined on the rotation axis 13 and form a certain angle between them. In the example illustrated in Figure 12, the intersection line of these planes passes by the symmetry axis of the bar, without this forms a feature indispensable for the operation of the mechanism, said intersection line may also be disposed outside of the symmetry axis of the bar. Likewise the angles formed by each of both crossed grooves with the rotation axis 13 may be equal to or different from each other.

It is obvious that the invention is not exclusively restricted to the embodiments shown and that many modifications may be made in the shape, arrangement and constitution of certain elements used in its construction, provided these modifications are not in contradiction with the matter of any of the following claims.

What I claim is:

1. In a variable speed device of the type having a pair of conical discs disposed with their apices towards each other and mounted on a first shaft for relative movement towards and away from each other axially of the shaft but angularly keyed thereto, a second pair of conical discs similarly disposed mounted and keyed on a second shaft parallel to the first shaft, each disc having grooves in its conical surface extending along the generatrices of the conical surfaces, a plurality of bars parallel to the shaft and mounted with their ends slidably retained in the grooves of the discs for radial movement towards and away from the shaft, said bars having an outer circumferential, belt-receiving surface the radius of curvature of which is less than that of a circle formed by the outer surfaces of the bars when in their radially innermost position.

2. In a variable speed device of the type having a pair of conical discs disposed with their apices towards each other and mounted on a first shaft for relative movement towards and away from each other axially of the shaft but angularly keyed thereto, a second pair of conical discs similarly disposed, mounted and keyed on a second shaft parallel to the first shaft, each disc having grooves in its conical surface extending along the generatrices of the conical surfaces, a plurality of bars parallel to the shaft and mounted with their ends slidably retained in the grooves of the discs for radial movement towards and away form the shaft, said bars having trapezoidal notches formed in their radially outermost surfaces for receiving a belt of trapezoidal cross section, the bottom of said notches having a radius of curvature less than that of a circle formed by the bottoms of said notches when the bars are in their radially innermost position, and the radially extending edges formed by the juncture of the side walls of the notches and the radial flanks of the bars being rounded.

3. A pulley of variable diameter comprising a shaft, two discs mounted on the shaft for relative axial movement toward and away from each other, but fixed to the shaft for rotation therewith, said discs having grooves in the opposite faces thereof disposed along the generatrices of two cones having the same apex angle, bars disposed parallel to the axis of said shaft and having their ends slidably mounted in said grooves, the grooves and the ends of the bars having a form such that upon axially moving the discs towards each other the bars will move away from the shaft and upon moving the discs away from each other, the bars will move towards the shaft, each of said bars having an outer belt engaging arcuate surface, the radius of curvature of which is equal to the radius of a circle substantially coinciding with the outer circumference of the bars when the bars are in their position closest to the shaft and each of said bars having a convex portion disposed on each side of the belt engaging surface and defined by a curve lying tangentially with respect to the belt engaging arcuate surface and having a radius of curvature less than that of the belt engaging surface and having a center of curvature within the circle of which the arcuate belt engaging surface is a portion.

4. A pulley of variable diameter comprising a shaft, two discs mounted on the shaft for relative axial movement toward and away from each other but fixed to the shaft for rotation therewith, said discs having grooves in the opposite faces thereof disposed along the generatrices of two cones having the same apex angle, bars disposed parallel to the axis of said shaft and having their ends slidably mounted in said grooves, the grooves and the ends of the bars having a form such that upon axially moving the discs towards each other, the bars will move away from the shaft and upon moving the discs away from each other, the bars will move towards the shaft, each of said bars having a trapezoidal notch for receiving a trapezoidal belt and having the walls of the notch convexly curved so that the notch is wider adjacent the lateral faces of the bar.

EMILE DELETAILLE.

REFERENCES CITED

The following references are of record in the file of this patent:

UNITED STATES PATENTS

| Number | Name | Date |
|---|---|---|
| 923,212 | Sturgess | June 1, 1909 |
| 923,788 | Gray | June 1, 1909 |

FOREIGN PATENTS

| Number | Country | Date |
|---|---|---|
| 54,520 | Sweden | Nov. 29, 1920 |
| 588,458 | Germany | Nov. 24, 1933 |